May 22, 1973 — C. F. BROWN — 3,734,775
CATCH BASIN CLEANING SYSTEM AND METHOD
Filed Nov. 4, 1970
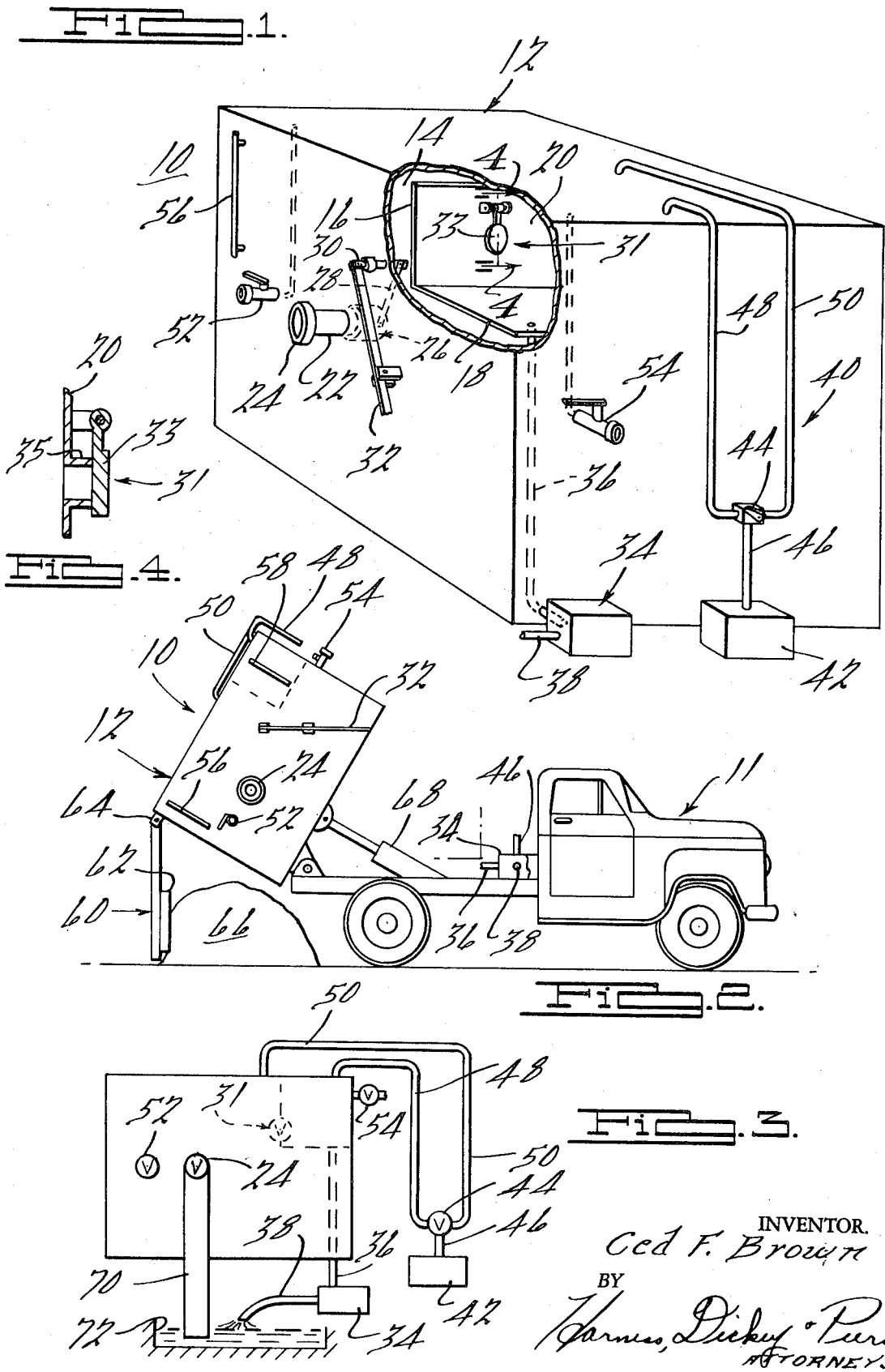

United States Patent Office 3,734,775
Patented May 22, 1973

3,734,775
CATCH BASIN CLEANING SYSTEM AND METHOD
Ced F. Brown, Redford, Mich., assignor of a fractional part interest to Mike Torosian, Detroit, Mich.
Filed Nov. 4, 1970, Ser. No. 86,899
Int. Cl. B08b 3/02, 9/00; E03f 9/00
U.S. Cl. 134—10
16 Claims

ABSTRACT OF THE DISCLOSURE

A cleaning system for catch basins and the like having a first tank for receiving debris and water educted from the catch basin and a second tank for receiving water from the first tank via a transfer valve communicating the first and second tanks. As a preliminary step, water may be passed from the first tank into the catch basin by gravity flow to break up the debris therein. The fluid in the second tank may be ejected into the catch basin under pressure to loosen and agitate the debris in the catch basin concurrently with the eduction of water and debris from the catch basin.

BACKGROUND AND SUMMARY OF THE INVENTION

It is conventional practice to remove debris such as sand, dirt, leaves, etc., from catch basins and the like by drawing the debris and water from the catch basin into a tank through an eductor hose inserted into the catch basin. Since the debris in catch basis is often heavily packed, means are often provided for forcibly returning a portion of the educted water to the catch basin through a return hose to break up and agitate the packed debris. With the prior art systems, water can only be ejected into the catch basin when debris is not being drawn from the catch basin. Therefore, the removal operation must be terminated before the agitation operation may begin. In prior art systems, a certain amount of "switch over" time is involved in adapting the system for one operation or the other.

The present invention provides a catch basin cleaning system whereby debris is drawn from the catch basin, and concurrently, water is forcibly ejected into the catch basin under pressure to loosen and agitate the packed debris. Accordingly, the present invention provides an efficient removal operation wherein the debris is being simultaneously agitated and removed from the catch basin resulting in significant time savings and operational advantages. Concurrent operation is made possible by a novel catch basin cleaning apparatus having a first tank for receiving the debris and water drawn from the catch basin, and a second tank for receiving at least a portion of the water from the catch basin at selected times so as to be available for forced ejection into the catch basin concurrently with the eduction of the debris and water from the catch basin. A transfer valve is incorporated which is openable to communicate the two tanks to transfer educted water from the first tank to the second tank. A valve is provided for selectively communicating the vacuum source to the first tank for educting debris and fluid from the catch basin, and to the second tank for drawing water from the first tank to the second tank when the transfer valve is open.

It is found that the eduction of the debris from the catch basin concurrently with the agitation of the debris within the catch basin results in an exceptional operational efficiency since the debris is not allowed to settle before it is drawn into the eductor. As an additional advantage, no switch over between eduction and agitation is required.

BRIEF DESCRIPTION OF THE DRAWINGS

FIG. 1 is a perspective partially cutaway illustration of an exemplary catch basin cleaning system according to the present invention;

FIG. 2 is a side view of the cleaning system of FIG. 1 shown mounted for portation on a truck;

FIG. 3 is a schematic diagram of the cleaning system of FIGS. 1 and 2 illustrating the operation of the cleaning system; and FIG. 4 is a detailed cross-sectional view of a transfer valve used in the cleaning system of FIG. 1.

DETAILED DESCRIPTION OF THE PREFERRED EMBODIMENT

In FIGS. 1 and 2, a cleaning system 10 is illustrated for removing debris such as sand, dirt, leaves, etc. from catch basins which is preferably mounted for portation on a truck or other vehicle 11 as illustrated in FIG. 2. The cleaning system 10 has a generally rectangular housing 12 which defines a first tank 14. Tank partitions 16 and 18 are mounted within the housing 12 to define a second tank 20. As can be seen in FIG. 1, the partitions 16 and 18 are common to both the tanks 14 and 20. The tank 14 is provided with an inlet conduit 22 and an inlet fitting 24 to receive debris and water from a catch basin or the like. The inlet fitting 24 is connected to an inlet valve assembly 26 which is operably connected to an operating rod 28 and a push rod 30 which is pivotally connected to a control handle 32 mounted exteriorly of the housing 12. The control handle 32 is pivotally mounted to the housing 12 to provide axial movement of the push rod 30 upon rotational movement thereof. Operation of the control handle 32 opens and closes the inlet valve 26.

The cleaning system 10 further includes a transfer valve assembly 31, shown in detail in FIG. 4, mounted on the partition 16 between the tanks 14 and 20 which includes a flapper valve member 33 and a flange 35 forming a seat for the flapper valve member 33. The flapper valve member 33 is mounted for pivotal movement away from the flange 35 and inwardly of the tank 20, in response to a pressure in the tank 14 which is greater than the pressure in the tank 20, to permit water to be transferred from the tank 14 to the tank 20. The flapper valve member 33 is adapted to close under its own weight when the pressures in the tanks 14 and 20 are substantially equal and is adapted to be held in sealed engagement with the flange 35 when the pressure in the tank 14 is less than the pressure in the tank 20. The second tank 20 is provided with a pump assembly 34 connected to the tank 20 by a conduit 36 for receiving water in the tank 20 and for discharging the water under pressure through an outlet conduit 38.

The system 10 has a vacuum system indicated generally at 40 including a vacuum pump 42 which is connected to a Y-valve 44 by a conduit 46. The Y-valve 44 is adapted to connect the vacuum pump 42 to either a line 48 or a line 50. Line 48 communicates with the upper portion of the tank 20 whereas the line 50 communicates with the upper portion of the tank 14 such that the Y-valve is operative to selectively evacuate air in the tanks 14 and 20 and provide a consequent reduced pressure therein. To permit dissipation of the reduced pressure in the tanks, the tanks 14 and 20 are provided with vacuum release valves 52 and 54, respectively. The tanks 14 and 20 are provided with sight gages 56 and 58, respectively, for determining the level of the water within each tank. The housing 12 has a door assembly 60 including a vacuum seal 62 which may be opened by upward pivoting about a hinge 64 to empty the debris, illustrated at 66, from the tank 14 when the housing 12 is tilted upwardly as shown, for example, by a hydraulic lift 68. It will be appreciated that before the door 60 may be opened, the vacuum release valve 52 must be opened to equalize the pressure across the door 60.

With reference now to FIG. 3, the operation of the cleaning system 10 will be explained. Upon arrival at the catch basin site, the tanks 14 and 20 are ordinarily at least partially prefilled with water. The water discharge conduit 38 and an eductor conduit 70 connected to the fitting 24 are inserted into a catch basin 72. Initially, a portion of water in the tank 14 is allowed to flow into the catch basin 72 under the force of gravity to aid in breaking up the debris packed in the catch basin 72. During this initial step, the vacuum release valve 52 is opened to facilitate flow of the water within the tank 14 into the catch basin 72. Following this initial operation, eduction and concurrent agitation of the debris within the catch basin commences. During the eduction and agitation operations, the vacuum release valve 52 for the tank 14 is closed, the vacuum release valve 54 for the tank 20 is open, and the Y-valve 44 is switched to communicate the tank 14 with the vacuum pump 42. The vacuum pump 42 is then operated to reduce the pressure on the tank 14, and consequently, to draw up or educt matter from the catch basin 72 into the tank 14. It will be appreciated that pressure within the tank 14 is quickly reduced since the tank 14 is initially partially filled with water. Concurrently with the operation of the vacuum pump 42, the water pump 34 is operated to pump water from the tank 20, through the water discharge conduit 38, into the catch basin 72 to agitate and loosen any packed debris within the catch basin 72. In view of the above explanation, it can be seen that debris and water are being educted from the catch basin 72 concurrently with the forced discharge of water from the water discharge conduit 38.

When the water in the tank 20 is depleted, the tank 20 may be replenished by opening the vacuum release valve 52 to release the vacuum in the tank 14 and opening the vacuum release valve 54 to allow the pressure of the water in the tank 14 to open the water transfer valve 31 to flow water into the tank 20 from the tank 14. The vacuum pump 42 may be used to expedite transfer of water from the tank 14 into the tank 20 by closing the vacuum release valve 54, and switching the Y-valve 44 to connect the conduit 48 to the vacuum pump 42 to reduce the pressure in the tank 20. In this manner, a pressure differential is created between the tanks 14 and 20 which draws fluid from the tank 14 into the tank 20. The water transfer operation, of course, depends upon a water level within the tank 20 which is at or above the inlet to the water transfer valve 26. When the supply of water within the tank 20 has been replenished, the vacuum release valve 52 for the tank 14 is closed, the vacuum release valve 54 for the tank 20 is opened, and the Y-valve 44 is switched to connect the vacuum pump 42 to the tank 14 such that the concurrent eduction and agitation operations may be resumed.

In view of the foregoing description of an exemplary cleaning system for a catch basin or the like, it will be appreciated that a novel system is provided which advantageously permits eduction of debris from the catch basin and concurrent agitation of the debris within the catch basin which has been found to be a highly effective method for cleaning catch basins and the like resulting in significant savings in time.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

I claim:

1. An apparatus for removing matter from catch basins and the like comprising: a first tank adapted to be at least partially prefilled with a liquid medium; conduit means communicating with said first tank for positioning in said basin; valve means associated with said conduit means for selectively flowing said liquid medium into said catch basin under the force of gravity to aid in breaking up debris packed in said catch basin; a vacuum source adapted to be connected to said first tank for drawing matter from said basin through said conduit means into said tank; a second tank containing a fluid to be discharged into said basin for agitating the matter therein, said second tank being adapted to discharge said fluid concurrently with the drawing of said matter from said basin into said first tank, and transfer valve means communicating with said first and second tanks being openable to transfer fluid from said first tank to said second tank.

2. An apparatus according to claim 1 wherein said vacuum source is further adapted to be connected to said second tank for drawing fluid from said first tank to said second tank through said transfer valve means.

3. An apparatus according to claim 1 further including:
   pump means receiving fluid from said second tank; and
   conduit means connected to said pump means for positioning in said basin for delivering fluid into said basin from said second tank to agitate said matter in said basin.

4. An apparatus according to claim 1 wherein said transfer valve means includes a flapper valve member adapted to close in response to a pressure within said first tank being less than the pressure in said second tank, and further being adapted to open in response to a pressure in said first tank being greater than the pressure in said second tank.

5. An apparatus according to claim 1 wherein said first tank further includes door means being openable for removal of matter drawn into said first tank from said basin.

6. An apparatus according to claim 5 further including means for tilting said first tank for causing movement of said matter within said first tank toward said door means.

7. An apparatus according to claim 6 wherein said door means further includes pivot means for providing upward pivoting of said door means.

8. An apparatus to be mounted on a vehicle for removing matter from catch basins and the like comprising: a first tank adapted to be at least partially prefilled with water for receiving said matter and water from said basin adapted to be mounted on said vehicle; educator hose means communicating with said first tank adapted to be extended into said basin; valve means associated with said conduit means for selectively flowing said water into said catch basin under the force of gravity whereby to aid in breaking up debris packed in said catch basin; a second tank for containing water adapted to be mounted on said vehicle; a vacuum pump; conduit means including a three-way valve for selectively connecting said vacuum pump to one of said first and second tanks; water pump means connected to said second tank for receiving said water from said tank and being openable for discharging said water under pressure; return hose means adapted to be connected to said water pump and to be extended into said basin for forcibly discharging water from said second tank into said basin for agitating the matter therein; valve means for said first tank for releasing vacuum therein established by said vacuum pump; valve means for said second tank for releasing vacuum therein established by said vacuum pump; and transfer valve means communicating with said first and second tanks being openable to provide for the transfer of water from said first tank to said second tank whereby with said first tank vacuum release valve means opened and said second tank vacuum release valve means closed, the connection of said vacuum pump to said second tank causes said water transfer, and said transfer valve being closable whereby, with said first tank vacuum release valve means closed and said second tank vacuum release valve means opened, and said water pump operating, the connection of said vacuum pump to said first tank causes said matter and water within said basin to be drawn from said basin concurrently with the forcible discharge of water into said basin.

9. The apparatus as recited in claim 8 wherein said eductor hose means is connected to said first tank at a position below a normal water level in said tank whereby sufficient head pressure is maintained to provide flow in such hose means between said first tank and said catch basin.

10. An apparatus according to claim 8 wherein said transfer valve means includes a flapper valve member adapted to close in response to a pressure within said first tank being less than the pressure in said second tank, and further being adapted to open in response to a pressure in said first tank being greater than the pressure in said second tank.

11. An apparatus according to claim 10 wherein said first tank further includes door means being openable for removal of matter drawn into said first tank from said basin.

12. An apparatus according to claim 11 further including means for tilting said first tank for causing movement of said matter within said first tank toward said door means.

13. An apparatus according to claim 12 wherein said door means further includes pivot means for providing upward pivoting of said door means.

14. An apparatus for removing matter from catch basins and the like comprising: a first tank adapted to be at least partially prefilled with a liquid medium, conduit means communicating with said first tank for positioning in said basin; a second tank containing a fluid to be discharged into said basin for agitating the matter therein; transfer valve means communicating with said first and second tanks being openable to transfer fluid from said first tank to said second tank; a vacuum source; means for selectively communicating said vacuum source to either said first or second tanks; and vacuum release means having an open and closed position and associated with said first tank for selectively releasing a vacuum therein whereby matter is drawn into said first tank when said source is in communication therewith and said release means is closed and the rate of transfer of said medium from said first tank to said second tank is increased by opening said release means and communicating said source to said second tank.

15. A method for removing matter from catch basins and the like comprising the steps of: flowing a fluid under the force of gravity into said catch basin to break up matter packed therewithin; drawing a fluid containing said matter from said catch basin into a first tank; transferring said fluid from the top of said first tank to a second tank and preventing reverse flow by means of a transfer valve; and concurrently with said drawing agitating said matter in said catch basin by discharging said fluid from said second tank into said catch basin.

16. The method of claim 15 wherein said transferring step includes concurrently retaining said matter in said first tank.

References Cited

UNITED STATES PATENTS

| | | | |
|---|---|---|---|
| 3,600,225 | 8/1971 | Parmelee | 134—24 |
| 2,596,151 | 5/1952 | Hudson | 134—168 R |
| 2,010,540 | 8/1935 | Evans | 134—22 R X |
| 287,811 | 11/1883 | Dougine | 134—10 X |
| 1,274,931 | 8/1918 | Otterson | 134—24 |
| 3,165,109 | 1/1965 | Hammelmann | 134—167 C X |
| 3,317,049 | 5/1967 | Petretti | 298—22 R |

FOREIGN PATENTS 1,043,228   11/1958   Germany _____ 134—21

JOSEPH SCOVRONEK, Primary Examiner

D. G. MILLMAN, Assistant Examiner

U.S. Cl. X.R.

134—21, 22 R, 168 R